United States Patent
Konno et al.

(10) Patent No.: US 10,081,710 B2
(45) Date of Patent: Sep. 25, 2018

(54) BRANCHED POLYARYLENE SULFIDE RESIN, METHOD FOR MANUFACTURING SAME AND USE AS POLYMER MODIFIER

(71) Applicant: Kureha Corporation, Tokyo (JP)

(72) Inventors: Akihiro Konno, Tokyo (JP); Yasuhiro Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/787,066

(22) Filed: Oct. 18, 2017

(65) Prior Publication Data

US 2018/0044477 A1 Feb. 15, 2018

Related U.S. Application Data

(62) Division of application No. 15/026,656, filed as application No. PCT/JP2014/075611 on Sep. 26, 2014.

(30) Foreign Application Priority Data

Oct. 1, 2013 (JP) ................. 2013-206849

(51) Int. Cl.
| C08G 75/00 | (2006.01) |
| C08G 75/0231 | (2016.01) |
| C08G 75/02 | (2016.01) |
| C08G 75/0213 | (2016.01) |
| C08G 75/0259 | (2016.01) |

(52) U.S. Cl.
CPC ......... *C08G 75/0231* (2013.01); *C08G 75/02* (2013.01); *C08G 75/0213* (2013.01); *C08G 75/0259* (2013.01)

(58) Field of Classification Search
CPC ................................................ C08G 75/0268
USPC ........................................................ 525/537
See application file for complete search history.

(56) References Cited

U.S. PATENT DOCUMENTS

| 8,648,142 B2 | 2/2014 | Kondo et al. |
| 8,859,720 B2 | 10/2014 | Shin et al. |
| 2008/0004375 A1 | 1/2008 | Kondo et al. |
| 2011/0257363 A1 | 10/2011 | Shin et al. |
| 2015/0065664 A1 | 3/2015 | Konno et al. |

FOREIGN PATENT DOCUMENTS

| CN | 101084274 A | 12/2007 |
| CN | 102325826 A | 1/2012 |
| EP | 1837359 A1 | 9/2007 |
| JP | 2010-126621 A | 6/2010 |
| JP | 5189293 B2 | 4/2013 |
| JP | 2013-181044 A | 9/2013 |
| WO | WO 2006/068159 A1 | 6/2006 |
| WO | WO 2006/068161 A1 | 6/2006 |
| WO | 200634054 A | 10/2006 |
| WO | WO 2013/101315 A1 | 7/2013 |
| WO | WO 2013/147141 A1 | 10/2013 |

OTHER PUBLICATIONS

Chinese Office Action and Chinese Search Report, dated Jan. 11, 2017, for Chinese Application No. 201480052764.3, with English translations.
International Search Report of PCT/JP2014/075611 dated Dec. 22, 2014.
Japanese Office Action, dated Feb. 14, 2017, for Japanese Application No. 2015-540470, with English translation.
Korean Notification of Reason for Refusal for Korean Application No. 10-2016-7009785, dated May 31, 2017, with an English translation.
Japanese Office Action, dated Sep. 12, 2017, for Japanese Application No. 2015-540470, with English translation.
Korean Office Action, dated Nov. 16, 2017, for Korean Application No. 10-2016-7009785, with English translation.

*Primary Examiner* — Shane Fang

(74) *Attorney, Agent, or Firm* — Birch, Stewart, Kolasch & Birch, LLP

(57) ABSTRACT

A branched polyarylene sulfide resin includes an —S— substituent group with a cleaved disulfide compound, which has a halogen content of 4,000 ppm or less, a melt viscosity as measured at a temperature of 330° C. and a shear rate of 2 $sec^{-1}$ of $1.0 \times 10^4$ to $50.0 \times 10^4$ Pa·s, and a melt viscoelasticity tan δ as measured at a temperature of 310° C. and an angular velocity of 1 rad/sec of 0.1 to 0.6.

4 Claims, No Drawings

BRANCHED POLYARYLENE SULFIDE RESIN, METHOD FOR MANUFACTURING SAME AND USE AS POLYMER MODIFIER

CROSS REFERENCE TO RELATED APPLICATIONS

This application is a Divisional of copending application Ser. No. 15/026,656, filed on Apr. 1, 2016, which was filed as PCT International Application No. PCT/JP2014/075611 on Sep. 26, 2014, which claims the benefit under 35 U.S.C. § 119(a) to Patent Application No. 2013-206849, filed in Japan on Oct. 1, 2013, all of which are hereby expressly incorporated by reference into the present application.

TECHNICAL FIELD

The present invention relates to a branched polyarylene sulfide resin including an —S— substituent group with a cleaved disulfide compound and a method for manufacturing the same. More particularly, the present invention relates to a branched polyarylene sulfide resin including an —S— substituent group with a cleaved disulfide compound which can solve problems of corrosion to a metal mold due to halogen and environmental problems and provide a molded product with significantly suppressed burrs (which are problematic during molding processing) when used as a burr suppressor and which has highly balanced characteristics of the halogen content, the melt viscosity and the melt viscoelasticity tan δ and a method for manufacturing the same. Further, the present invention relates to use of the branched polyarylene sulfide resin as a polymer modifier.

BACKGROUND ART

Polyarylene sulfide resins (hereinafter abbreviated as "PAS resin"), representative examples of which polyphenylene sulfide resins (hereinafter abbreviated as "PPS resin"), are engineering plastics exhibiting excellent heat resistance, chemical resistance, flame retardancy, mechanical strength, characteristics, dimensional stability, and the like. The PAS resin can be formed into various molded products such as films, sheets and fibers by a general melt molding method such as injection molding, extrusion molding or compression molding. Thus, the resin is widely used as a material for resin parts in a wide range of fields including electrical and electric devices, automobile devices and chemical devices.

A known example of a representative method for manufacturing a PAS resin is a method of reacting a sulfur source and a dihalo aromatic compound in an organic amide solvent such as N-methyl-2-pyrrolidone (hereafter abbreviated as "NMP"). A PAS resin obtained by this method typically tends to have a structure in which a halogen bonds to the terminal of a polymer and therefore has a high halogen content, even when sufficiently washed in the separation and recovery step after a polymerization reaction. When such a PAS resin having a high halogen content is used, the corrosion to a metal mold during molding processing as described above or environmental pollution as evidenced by halogen regulations become problems. Further, since the manufacturing conditions of the PAS resin are wide ranging, it is difficult to adjust the conditions. Particularly, it is difficult to achieve a balance between processability or fusion characteristics and burr suppressing characteristics during injection molding. There is a disadvantage in that the amount of burrs generated during injection molding is large.

The term "burr" means a portion of a molding material which enters the space between the two parts of a metal mold and solidifies. It is necessary to remove the burr which is solidified into a thin film or flake and attached to a molded product in a finishing step.

In order to reduce the halogen content of the PAS resin, the PAS resin is conventionally washed with high temperature water or an organic solvent in the separation and recovery step after the polymerization reaction. Examples of the organic solvent include the same organic amide solvent as the polymerization solvent, ketones (e.g., acetone) and alcohols (e.g., methanol). Thus, in order to reduce the halogen content of the PAS resin, the halogen content has always been reduced by washing.

On the other hand, a method for adding a branched PAS resin to a linear PAS resin is suggested to suppress generation of burrs during injection molding.

The following has been reported in Japanese Patent No. 5189293: when a branched PAS resin is manufactured by a method including the steps of: reacting a sulfur source with a dihalo aromatic compound in an organic amide solvent; and adding a polyhalo aromatic compound having three or more halogen substituent groups to the polymerization reaction mixture at a predetermined ratio at a stage when the conversion ratio of the dihalo aromatic compound becomes sufficiently high, a branched PAS resin in which all the melt viscosity, average particle size and melt viscoelasticity tan δ are within an appropriate range can be obtained. For example, when the branched PAS resin is blended with a linear PAS resin, an effect as a burr suppressor is exerted and further the surface properties of the molded product are improved.

However, although a PAS resin having a low halogen content and excellent characteristics of suppressing generation of burrs has been earnestly developed, a target resin having such characteristics has not currently been obtained. In the field of the PAS resin, there is a daily increasing demand for the above-described characteristics. The present inventors have developed and studied to satisfy the demand for improvement.

CITATION LIST

Patent Literature

Patent Document 1: Japanese Patent No. 5189293B (corresponding to EP 1837359 A1)

SUMMARY OF INVENTION

Technical Problem

An object of the present invention is to provide a branched PAS resin including an —S— substituent group with a cleaved disulfide compound which has a low halogen (chlorine) content when blended with a thermoplastic resin such as a linear PAS resin as a polymer modifier, is excellent in corrosion resistance to a metal mold, is able to clear environmental regulations, significantly suppresses generation of burrs, and has highly balanced characteristics of the halogen content, the melt viscosity and the melt viscoelasticity tan δ and a method for manufacturing the same.

The branched PAS resin including an —S— substituent group with a cleaved disulfide compound of the present invention is a granular resin having excellent thermal stability and processability.

Further, the branched PAS resin including an —S— substituent group with a cleaved disulfide compound of the present invention has a low halogen content, but it produces an effect as a burr suppressor in a region of a wide range of melt viscosity and melt viscoelasticity (tan δ).

Furthermore, the branched PAS resin including an —S— substituent group with a cleaved disulfide compound of the present invention has a low halogen content, but it produces an effect as a burr suppressor even in a region of low melt viscosity and high melt viscoelasticity (tan δ), and thus it exerts an effect of improving surface properties of the molded product.

The present inventors have focused on the introduction of a branched structure to a PAS resin, cleavage of an —S—S— portion of a disulfide compound and substitution capability of the cleaved compound for the terminals of the PAS polymer in order to increase the performance and solve problems on the halogen (chlorine) content (namely, environmental regulations on halogen, problems of corrosion resistance to a metal mold and the like) by using the conventional branched PAS resin as a polymer modifier, and conceived a method for manufacturing a branched PAS resin in which the polymerization reaction conditions are highly controlled.

Hence, they have conceived a method for manufacturing a branched PAS resin including the steps of: performing a polymerization reaction of a sulfur source with a dihalo aromatic compound in an organic amide solvent using the dihalo aromatic compound in an amount of from 0.95 to 1.02 mol per mol of sulfur source; adding a disulfide compound in an amount of from 0.001 to 0.03 mol per mol of sulfur source during the time interval between a stage when the conversion ratio of the dihalo aromatic compound is 0% and a stage when a polyhalo aromatic compound is added and reacting the mixture; adding a polyhalo aromatic compound (in an amount of from 0.002 to 0.06 mol per mol of sulfur source and an amount of from 0.2 to 12 mol per mol of disulfide compound) to the polymerization reaction mixture at a stage when the conversion ratio of the dihalo aromatic compound reaches 80% or greater; and performing a phase separation polymerization reaction in the presence of a phase separation agent.

The manufacturing method of the present invention is divided into the following three important points: That is, the points include (a) performing a polymerization reaction of a sulfur source with a dihalo aromatic compound in an organic amide solvent using the dihalo aromatic compound in an amount of from 0.95 to 1.02 mol per mol of sulfur source; (b) adding a disulfide compound in an amount of from 0.001 to 0.03 mol per mol of sulfur source during the time interval between a stage when the conversion ratio of the dihalo aromatic compound is 0% and a stage when a polyhalo aromatic compound is added and reacting the mixture; and (c) adding a polyhalo aromatic compound (in an amount of from 0.002 to 0.06 mol per mol of sulfur source and an amount of from 0.2 to 12 mol per mol of disulfide compound) to the polymerization reaction mixture at a stage when the conversion ratio of the dihalo aromatic compound reaches 80% or greater and performing a phase separation polymerization reaction in the presence of a phase separation agent.

The first step of "(a) performing a polymerization reaction of a sulfur source with a dihalo aromatic compound in an organic amide solvent using the dihalo aromatic compound in an amount of from 0.95 to 1.02 mol per mol of sulfur source" provides an effect resulting in control of melt viscosity based on the adjustment of molecular weight, reduction of the halogen (chlorine) content by decreasing the number of polymer terminals having halogen (chlorine) and facilitation of the reaction of the disulfide compound and/or the polyhalo aromatic compound in the polymerization reaction field.

As a result, a branched PAS resin having a wide estimated range of melt viscosity, low halogen (chlorine) content and excellent processability is obtained.

An object of the second step of "(b) adding a disulfide compound in an amount of from 0.001 to 0.03 mol per mol of sulfur source during the time interval between a stage when the conversion ratio of the dihalo aromatic compound is 0% and a stage when a polyhalo aromatic compound is added and reacting the mixture" is to modify some terminals of a PAS in the middle of the polymerization so as to include an —S— substituent group with a cleaved disulfide compound.

Thus, when some terminals of the PAS in the middle of the polymerization are modified so as to include an —S— substituent group with a cleaved disulfide compound, the terminals play no role in the subsequent growth. Consequently, an effect resulting in reduction of molecular weight of the PAS is given and an effect resulting in reduction of melt viscosity is eventually given.

At the same time, the halogen (chlorine) at the terminal is converted to an —S— substituent group, and thus an effect resulting in control of a branched state or reduction of the halogen (chlorine) content is given.

In order to maximize the object and effects, it is important to strictly adjust the ratio of the disulfide compound to the sulfur source and the addition stage of the disulfide compound and to adjust the ratio of the dihalo aromatic compound to the sulfur source in the first step.

The third step of "(c) adding a polyhalo aromatic compound (in an amount of from 0.002 to 0.06 mol per mol of sulfur source and an amount of from 0.2 to 12 mol per mol of disulfide compound) to the polymerization reaction mixture at a stage when the conversion ratio of the dihalo aromatic compound reaches 80% or greater and performing a phase separation polymerization reaction in the presence of a phase separation agent" is a step of introducing a branched structure using a polyhalo aromatic compound as described above.

However, this step is different from the conventional step. In terms of the fact that a PAS including an —S— substituent group where a disulfide compound is cleaved at the terminals is polymerized into a branched structure, this step differs from the conventional step of introducing a branched structure.

That is, the method for manufacturing a branched PAS resin of the present invention has characteristics in that, in addition to a polymerization reaction with a dihalo aromatic compound, a reaction with a disulfide compound and a reaction with a polyhalo aromatic compound are carried out in the polymerization reaction field.

Therefore, in order to introduce the branched structure targeted by the present invention, the key points are as follows: the ratio of the polyhalo aromatic compound to the sulfur source and the adjustment of the addition stage as well as the ratio of the polyhalo aromatic compound to the disulfide compound and particularly the adjustment of the ratio of the dihalo aromatic compound to the sulfur source in the first step.

In the reaction of the polyhalo aromatic compound to introduce a branched structure into the PAS resin, it is important to form a liquid-liquid phase separation state in which a produced polymer dense phase and a produced polymer dilute phase are both present in a liquid phase in the polymerization reaction system as the polymerization reaction field by using the phase separation agent. Such a polymerization reaction in a liquid-liquid phase separation state is also called "phase separation polymerization reaction".

In this produced polymer dense phase, the reaction of the polyhalo aromatic compound mainly proceeds and the bonding of the polymers increases the molecular weight. Thus, a branched PAS resin having a target melt viscosity is formed.

The branched PAS resin has characteristics in that the halogen (chlorine) content is reduced by the bonding effect of the polymers and further a granular PAS resin is obtained.

The branched PAS resin thus polymerized includes an —S— substituent group where a disulfide compound is cleaved at some of the terminals of the polymer.

Consequently, in the branched PAS resin polymerized in this step, it is possible to make the halogen (chlorine) content low, and it is possible to rationalize the melt viscosity and it is possible realize a wider range of numerical value of melt viscoelasticity tan δ which is an indicator of branched structure. Further, it is possible to obtain a branched PAS resin in a granular form.

Thus, the manufacturing method of the present invention can provide a branched PAS resin having a highly balanced and appropriate range of (i) the halogen (chlorine) content, (ii) the melt viscosity and (iii) the branched structure (melt viscoelasticity tan δ as an indicator).

For example, in Working Example 4 described below, the halogen (chlorine) content is as low as 1,650 ppm, the melt viscoelasticity tan δ as measured at a temperature of 310° C. and an angular velocity of 1 rad/sec is 0.55 and the melt viscosity as measured at a temperature of 330° C. and a shear rate of 2 $sec^{-1}$ is as remarkably low as 45,000 Pa·s. Nevertheless, a burr suppressing effect is produced.

According to the manufacturing method of the present invention, it is possible to obtain a branched PAS resin including an —S— substituent group with a cleaved disulfide compound which has such excellent characteristics. The present invention has been completed based on these findings.

Solution to Problem

Thus, according to the present invention, there is provided a branched polyarylene sulfide resin including an —S— substituent group with a cleaved disulfide compound, wherein the resin has the following characteristics i to iii:
i) a halogen content of 4,000 ppm or less;
ii) a melt viscosity as measured at a temperature of 330° C. and a shear rate of 2 $sec^{-1}$ of $1.0 \times 10^4$ to $50.0 \times 10^4$ Pa·s; and
iii) a melt viscoelasticity tan δ as measured at a temperature of 310° C. and an angular velocity of 1 rad/sec of 0.1 to 0.6.

Further, according to the present invention, there is provided a method for manufacturing a branched polyarylene sulfide resin including an —S— substituent group with a cleaved disulfide compound that polymerizes a sulfur source with a dihalo aromatic compound in an organic amide solvent in the presence of a disulfide compound and a polyhalo aromatic compound having three or more halogen substituent groups in the molecule, the method including the steps of: performing a polymerization reaction of a sulfur source with a dihalo aromatic compound in an organic amide solvent using the dihalo aromatic compound in an amount of from 0.95 to 1.02 mol per mol of sulfur source; adding a disulfide compound in an amount of from 0.001 to 0.03 mol per mol of sulfur source during the time interval between a stage when the conversion ratio of the dihalo aromatic compound is 0% and a stage when a polyhalo aromatic compound is added and reacting the mixture; adding a polyhalo aromatic compound (in an amount of from 0.002 to 0.06 mol per mol of sulfur source and an amount of from 0.2 to 12 mol per mol of disulfide compound) to the polymerization reaction mixture at a stage when the conversion ratio of the dihalo aromatic compound reaches 80% or more; and performing a phase separation polymerization reaction in the presence of a phase separation agent.

Furthermore, according to the present invention, there is provided use of a branched PAS resin including an —S— substituent group with a cleaved disulfide compound as a polymer modifier.

Further, according to the present invention, there is provided use wherein the use of a branched PAS resin including an —S— substituent group with a cleaved disulfide compound as a polymer modifier is use as a burr suppressor with respect to a linear PAS resin.

The term "branched PAS resin including an —S— substituent group with a cleaved disulfide compound" used herein (hereinafter, sometimes simply referred to as "branched PAS resin") means a PAS resin in which some terminals of a PAS in the middle of the polymerization are modified by a reaction of the PAS in the middle of the polymerization with a disulfide compound before introduction of a branched structure in the polymerization step and then the branched structure is introduced. The PAS resin into which the branched structure of the present invention is introduced preferably includes no crosslinked structure, but may include a small amount of a crosslinked structure which is a byproduct formed by the polymerization reaction.

The term "linear PAS resin" used herein means a PAS resin having a substantially linear structure. The linear PAS resin of the present invention may include a small amount of a branched or crosslinked structure.

Advantageous Effect of Invention

In the branched PAS resin including an —S— substituent group with a cleaved disulfide compound of the present invention, the halogen (chlorine) content is low, and it is possible to rationalize the melt viscosity and it is possible to realize a wider range of numerical value of melt viscoelasticity tan δ which is an indicator of branched structure. The branched PAS resin including an —S— substituent group with a cleaved disulfide compound of the present invention can significantly suppress generation of burrs, reduce the halogen content, and solve environmental problems (low halogenation) and problems of corrosion to a metal mold, when blended with a thermoplastic resin such as a linear PAS resin as the polymer modifier. Further, the branched PAS resin including an —S— substituent group with a cleaved disulfide compound of the present invention is a granular resin excellent in thermal stability and processability.

DESCRIPTION OF EMBODIMENTS

1. Sulfur Source:

In the present invention, an alkali metal sulfide or an alkali metal hydrosulfide or a mixture thereof is used as a sulfur source. Also, a hydrogen sulfide may be used as the sulfur source.

It is preferable to use a sulfur source which contains an alkali metal hydrosulfide or an alkali metal hydrosulfide as a main component. Examples of the alkali metal hydrosulfide include lithium hydrosulfide, sodium hydrosulfide, potassium hydrosulfide, rubidium hydrosulfide, cesium hydrosulfide, and a mixture of two or more kinds thereof, but are not particularly limited thereto. The alkali metal hydrosulfide may be used in any form of an anhydride, a hydrate and an aqueous solution. Among them, sodium hydrosulfide and lithium hydrosulfide are preferred from the viewpoint of being industrially available at low cost. The alkali metal hydrosulfide is preferably used as an aqueous mixture (i.e., a mixture with water having fluidity) from the viewpoint of treatment operation, metering, and the like.

In the step of manufacturing alkali metal hydrosulfide, a small amount of a byproduct of alkali metal sulfide is generally formed. The alkali metal hydrosulfide used in the present invention may contain a small amount of alkali metal sulfide. The alkali metal hydrosulfide tends to be stable when it contains a small amount of alkali metal sulfide.

When the sulfur source is a mixture of alkali metal hydrosulfide and alkali metal sulfide, the composition includes 70 to 100 mol % of alkali metal hydrosulfide and 0 to 30 mol % of alkali metal sulfide, preferably 90 to 99.8 mol % of alkali metal hydrosulfide and 0.2 to 10 mol % of alkali metal sulfide, more preferably 93 to 99.7 mol % of alkali metal hydrosulfide % and 0.3 to 7 mol % of alkali metal sulfide, and even more preferably 95 to 99.6 mol % of alkali metal hydrosulfide % and 0.4 to 5 mol % of alkali metal sulfide, from the viewpoint of the stability of the polymerization reaction system.

When the sulfur source is a mixture of alkali metal hydrosulfide and alkali metal sulfide, the total molar amount of alkali metal hydrosulfide and alkali metal sulfide is a molar amount of the charged sulfur source (sometimes referred to as "effective sulfur source"). Further, the total molar amount is a molar amount of the charged sulfur source after the dehydration step in the case of inserting the dehydration step prior to the preparation step.

Examples of the alkali metal sulfide include lithium sulfide, sodium sulfide, potassium sulfide, rubidium sulfide, cesium sulfide, and a mixture of two or more kinds thereof, but are not particularly limited thereto. The alkali metal sulfide may be used in any form of an anhydride, a hydrate and an aqueous solution. Among them, sodium sulfide is preferred from the viewpoint of being industrially available at low cost and easily handled.

2. Alkali Metal Hydroxide:

In the manufacturing method of the present invention, it is preferable to employ a method for polymerizing a sulfur source containing an alkali metal hydrosulfide and a dihalo aromatic compound in a water-containing organic amide solvent in the presence of alkali metal hydroxide.

Examples of the alkali metal hydroxide include lithium hydroxide, sodium hydroxide, potassium hydroxide, rubidium hydroxide, cesium hydroxide and a mixture of two or more kinds thereof, but are not particularly limited thereto. Among them, sodium hydroxide is preferred from the viewpoint of being industrially available at low cost. The alkali metal hydroxide is preferably used as an aqueous mixture (i.e., a mixture with water having fluidity) from the viewpoint of handling property, such as metering.

3. Dihalo Aromatic Compound:

The dihalo aromatic compound used in the present invention is a dihalogenated aromatic compound having two halogen atoms directly bonded to the aromatic ring. Specific examples of the dihalo aromatic compound include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide and dihalodiphenyl ketone. These dihalo aromatic compounds may be used singly, or in combination of two or more kinds thereof.

Here, the halogen atom means each atom of fluorine, chlorine, bromine and iodine and is preferably a chlorine atom. Two halogen atoms in the dihalo aromatic compound may be the same or different from each other. As the dihalo aromatic compound, o-dichlorobenzene, m-dichlorobenzene, p-dichlorobenzene or a mixture of two or more kinds thereof is used in many cases.

4. Disulfide Compound

In the present invention, the polymerization reaction in the polymerization step is performed in the presence of a disulfide compound. The disulfide compound is added during the time interval between a stage when the conversion ratio of the dihalo aromatic compound is 0% and a stage when the polyhalo aromatic compound is added, namely, during the time interval between a stage when the conversion ratio of the dihalo aromatic compound after the start of polymerization is 0% and a stage before the polyhalo aromatic compound is added.

Examples of the disulfide compound include diphenyl disulfide (DPDS), p-p'ditolyldisulfide, dibenzyldisulfide, dibenzoyldisulfide and dithiobenzoyldisulfide. Among them, diphenyl disulfide is preferred.

The disulfide compound has an —S—S— portion, and thus an —S— substituent group formed by the cleavage of the disulfide compound is assumed to be substituted for halogen groups (chlorine groups) at some terminals of the PAS in the middle of the polymerization. For example, when the disulfide compound is diphenyl disulfide, the branched PAS resin obtained by separating and recovering after the polymerization reaction contains —S—$C_6H_5$ which has reacted with the terminals.

That is, when the disulfide compound is diphenyl disulfide and the dihalo aromatic compound is dihalobenzene, most of the terminal group components of the branched PAS resin of the present invention are formed from —Cl, —S—$C_6H_5$ which is a reacted disulfide compound, —SH, and nitrogen compounds derived from the organic amide solvent. An analysis of these terminal end components can be performed quantitatively or qualitatively by elemental analysis, high-temperature NMR analysis, or IR analysis. In addition, as a specific example of these assay methods, it is possible to calculate the amount of —S—$C_6H_5$, which is a reacted disulfide compound, by assaying —Cl by elemental analysis, assaying —SH by a titration, a derivative reaction, or an IR method, or analyzing the nitrogen of nitrogen compounds derived from the organic amide solvent.

5. Polyhalo Aromatic Compound:

In the present invention, a polyhalo aromatic compound having three or more halogen substituent groups in the molecule is used to introduce a branched structure into the PAS resin. The halogen substituent group is typically a halogen atom directly bonded to the aromatic ring. The halogen atom means each atom of fluorine, chlorine, bromine and iodine and is preferably a chlorine atom. A plurality of halogen atoms in the polyhalo aromatic compound may be the same or different from each other.

Examples of the polyhalo aromatic compound include 1,2,3-trichlorobenzene, 1,2,4-trichlorobenzene, 1,3,5-trichlorobenzene, hexachlorobenzene, 1,2,3,4-tetrachlorobenzene, 1,2,4,5-tetrachlorobenzene, 1,3,5-trichloro-2,4,6-trimethylbenzene, 2,4,6-trichlorotoluene, 1,2,3-trichloronaphthalene, 1,2,4-trichloronaphthalene, 1,2,3,4-tetrachloronaphthalene, 2,2',4,4'-tetrachlorobiphenyl, 2,2',4,4'-tetrachlorobenzophenone and 2,4,2'-trichlorobenzophenone.

These polyhalo aromatic compounds may be used singly, or in combination of two or more kinds thereof. Among the polyhalo aromatic compounds, trihalobenzene such as 1,2,4-trichlorobenzene or 1,3,5-trichlorobenzene is preferred, and trichlorobenzene is more preferred.

In order to introduce a branched structure, for example, an active hydrogen-containing halogenated aromatic compound or a halogenated aromatic nitro compound may be used in a small amount.

6. Molecular Weight Modifier:

In order to form a terminal of a specific structure in a PAS formed or regulate a polymerization reaction or a molecular weight, a monohalo compound may be used in combination. Not only a monohalo aromatic compound but also a monohalo aliphatic compound may be used. Examples of the monohalo compound include monohalo-substituted saturated or unsaturated aliphatic hydrocarbons such as monohalopropane, monohalobutane, monohaloheptane, monohalohexane, aryl halide and chloroprene; monohalo-substituted saturated cyclic hydrocarbons such as monohalocyclohexane and monohalodecalin; monohalo-substituted aromatic hydrocarbons such as monohalobenzene, monohalonaphthalene, 4-chlorobenzoic acid, methyl 4-chlorobenzoate, 4-chlorodiphenyl sulfone, 4-chlorobenzonitrile, 4-chlorobenzotrifluoride, 4-chloronitrobenzene, 4-chloroacetophenone, 4-chlorobenzophenone and benzyl chloride; and the like.

7. Organic Amide Solvent:

In the present invention, an organic amide solvent, which is an aprotic polar organic solvent, is used as a solvent for the dehydration reaction and the polymerization reaction. The organic amide solvent is preferably stable toward alkali at high temperatures.

Specific examples of the organic amide solvent include amide compounds such as N,N-dimethylformamide and N,N-dimethylacetamide; N-alkyl caprolactam compounds such as N-methyl-ε-caprolactam; N-alkyl pyrrolidone compounds or N-cycloalkyl pyrrolidone compounds such as N-methyl-2-pyrrolidone and N-cyclohexyl-2-pyrrolidone; N,N-dialkyl imidazolidinone compounds such as 1,3-dialkyl-2-imidazolidinone; tetraalkyl urea compounds such as tetramethyl urea; and hexaalkyl phosphoric acid triamide compounds such as hexamethyl phosphoric acid triamide; and the like. These organic amide solvents can be used singly, or in combination of two or more kinds thereof.

Among these organic amide solvents, N-alkyl pyrrolidone compounds, N-cycloalkyl pyrrolidone compounds, N-alkyl caprolactam compounds, and N,N-dialkyl imidazolidinone compounds are preferred, N-methyl-2-pyrrolidone (NMP), N-methyl-ε-caprolactam, and 1,3-dialkyl-2-imidazolidinone are more preferred, and NMP is particularly preferred.

8. Polymerization Assisting Agent:

In the present invention, as necessary, various polymerization assisting agents can be used to facilitate the polymerization reaction. Specific example of the polymerization assisting agents include organic sulfonic acid metal salts, which are generally known as a polymerization assisting agent of PAS resin, lithium halide, organic carboxylic acid metal salts and phosphoric acid alkali metal salts.

9. Phase Separation Agent:

In the present invention, various phase separation agents can be used to induce a liquid-liquid phase separation state so as to obtain a PAS with an adjusted melt viscosity in a short amount of time with a low halogen content. A phase separation agent is a compound having an action of dissolving in an organic amide solvent so as to reduce the solubility of the PAS in the organic amide solvent by itself or in the presence of a small amount of water. The phase separation agent itself is a compound that is not a solvent of the PAS.

A compound that is publicly known as a phase separation agent of PAS can be typically used as the phase separation agent. Also, a compound to be used as a polymerization assisting agent is included in the phase separation agent. Here, the phase separation agent means a compound that is used at a quantitative ratio to serve as the phase separation agent in the phase separation polymerization reaction. Specific examples of the phase separation agent include water, organic carboxylic acid metal salts, organic sulfonic acid metal salts, alkali metal halides such as lithium halide, alkaline earth metal halides, alkaline earth metal salts of aromatic carboxylic acids, phosphoric acid alkali metal salts, alcohols and paraffin hydrocarbons, and the like. The organic carboxylic acid metal salts are preferably alkali metal carboxylic salts such as lithium acetate, sodium acetate, potassium acetate, sodium propionate, lithium valerate, lithium benzoate, sodium benzoate, sodium phenylacetate and potassium p-toluylate. These phase separation agents may be used singly, or in combination of two or more kinds thereof. Among these phase separation agents, water (which is inexpensive and in which the posttreatment step is easy) or a combination of water with organic carboxylic acid metal salts such as alkali metal carboxylic salts is particularly preferred.

10. Method for Manufacturing Branched PAS Resin Including an —S— Substituent Group with a Cleaved Disulfide Compound:

The method for manufacturing a branched PAS resin of the present invention is a method for manufacturing a branched PAS resin having main characteristics in that the ratio of the dihalo aromatic compound to the sulfur source is controlled so as to be decreased and some terminals of a PAS in the middle of the polymerization are modified by a reaction of the PAS in the middle of the polymerization with a disulfide compound before introduction of a branched structure in the polymerization step and then the branched structure is introduced.

More specifically, the manufacturing method of the present invention is a method for manufacturing a branched polyarylene sulfide resin including an —S— substituent group with a cleaved disulfide compound that polymerizes a sulfur source with a dihalo aromatic compound in an organic amide solvent in the presence of a disulfide compound and a polyhalo aromatic compound having three or more halogen substituent groups in the molecule, the method including the steps of: performing a polymerization reaction of a sulfur source with a dihalo aromatic compound in an organic amide solvent using the dihalo aromatic compound in an amount of from 0.95 to 1.02 mol per mol of sulfur source; adding a disulfide compound in an amount of from 0.001 to 0.03 mol per mol of sulfur source during the time interval between a stage when the conversion ratio of the dihalo aromatic compound is 0% and a stage when a polyhalo aromatic compound is added and reacting the mixture; adding a polyhalo aromatic compound (in an amount of from 0.002 to 0.06 mol per mol of sulfur source and an amount of from 0.2 to 12 mol per mol of disulfide compound) to the polymerization reaction mixture at a stage when the conversion ratio of the dihalo aromatic compound reaches 80% or greater; and performing a phase separation polymerization reaction in the presence of a phase separation agent.

The manufacturing method of the present invention includes essential steps of: (i) performing a polymerization reaction of a sulfur source with a dihalo aromatic compound in an organic amide solvent using the dihalo aromatic compound in an amount of from 0.95 to 1.02 mol per mol of sulfur source; (ii) adding a disulfide compound in an amount of from 0.001 to 0.03 mol per mol of sulfur source during the time interval between a stage when the conversion ratio of the dihalo aromatic compound is 0% and a stage when a polyhalo aromatic compound is added and reacting the mixture; and (iii) adding a polyhalo aromatic compound (in an amount of from 0.002 to 0.06 mol per mol of sulfur source and an amount of from 0.2 to 12 mol per mol of disulfide compound) to the polymerization reaction mixture at a stage when the conversion ratio of the dihalo aromatic compound reaches 80% or greater and performing a phase separation polymerization reaction in the presence of a phase separation agent.

Particularly, the manufacturing conditions in the steps (i) to (iii) allow for the production of a branched PAS resin having a highly balanced and appropriate range of the halogen (chlorine) content, the melt viscosity and the branched structure (melt viscoelasticity tan δ as an indicator) as described above. Therefore, these manufacturing requirements are restrictions that constitute the basis of the manufacturing method of the present invention.

Specifically, it is preferable to accurately adjust the content ratio of each of the components by inserting a dehydration step and a charging step before the polymerization step to perform a polymerization reaction. It is preferable to use a sulfur source containing an alkali metal hydrosulfide as the sulfur source. The sulfur source and the alkali metal hydroxide are preferable in that they are both present in the polymerization reaction system.

Consequently, the preferred manufacturing method of the present invention is a method for manufacturing a branched PAS resin including an —S— substituent group with a cleaved disulfide compound, including: the steps of: (1) heating a mixture containing an organic amide solvent, a sulfur source including an alkali metal hydrosulfide and an alkali metal hydroxide, and discharging at least part of the distillate containing water from the inside of the system containing the mixture to the outside of the system (dehydration step 1); (2) mixing the mixture remaining inside the system in the dehydration step 1 with a dihalo aromatic compound to prepare a charged mixture containing an organic amide solvent, a sulfur source (hereinafter, referred to as "charged sulfur source"), an alkali metal hydroxide, water and a dihalo aromatic compound, wherein the amount of the dihalo aromatic compound in the charged mixture is from 0.95 to 1.02 mol per mol of charged sulfur source (charging step 2); (3) heating the charged mixture to a temperature of from 170 to 270° C. and performing a polymerization reaction of the charged sulfur source and the dihalo aromatic compound in a water-containing organic amide solvent; adding a disulfide compound in an amount of from 0.001 to 0.03 mol per mol of charged sulfur source during the time interval between a stage when the conversion ratio of the dihalo aromatic compound is 0% and a stage when a polyhalo aromatic compound is added and reacting the mixture; adding a polyhalo aromatic compound (in an amount of from 0.002 to 0.06 mol per mol of charged sulfur source and an amount of from 0.2 to 12 mol per mol of disulfide compound) to the polymerization reaction mixture at a stage when the conversion ratio of the dihalo aromatic compound reaches 80% or greater and performing a polymerization reaction (prestage polymerization step 3); and (4) heating the polymerization reaction mixture to a temperature of 240° C. or higher and performing a phase separation polymerization reaction at a temperature of from 240 to 290° C. in the presence of a phase separation agent (poststage polymerization step 4). It is clear that the conventional method of using a sulfur source containing an alkali metal hydrosulfide and reacting the sulfur source with a dihalo aromatic compound and a polyhalo aromatic compound in the presence of the alkali metal hydroxide is suitable as a method for manufacturing a branched PAS resin having an excellent balance in various characteristics.

According to the research results by the present inventors, the main difference between the method for manufacturing a branched PAS resin of the present invention and the conventional method of manufacturing a branched PAS resin is that (i) the ratio of the dihalo aromatic compound to the sulfur source is strictly controlled so as to be decreased, and (ii) the terminals of a PAS are modified by a reaction of the PAS in the middle of the polymerization with a disulfide compound before introduction of a branched structure in the polymerization step and then the branched structure is introduced.

The newly discovered manufacturing conditions indicate that it is possible to reduce the halogen (chlorine) content, and it is possible realize a wider range of numerical value of melt viscosity or melt viscoelasticity tan δ, and it is possible to obtain a branched PAS resin including an —S— substituent group with a cleaved disulfide compound which is preferred as a polymer modifier.

In order to stably perform this polymerization reaction, it is preferable to adjust the content ratio of each of the components to be subjected to a polymerization reaction, to accurately adjust, particularly the ratio of halogen to the sulfur source in the polymerization reaction field, and to strictly control the polymerization conditions such as the stage of substitution of the disulfide compound for the terminals of the PAS, the stage of start of the chain branching reaction with the polyhalo aromatic compound, the ratio of the polyhalo aromatic compound to the disulfide compound and the timing for inducing a liquid-liquid phase separation state. Hereinafter, the preferred manufacturing method of the present invention will be described more in detail.

10.1. Dehydration Step 1:

The sulfur source contains water such as hydrated water (crystallization water) in many cases. When the sulfur source and alkali metal hydroxide are used as aqueous mixtures, they contain water as media. The polymerization reaction of the sulfur source and the dihalo aromatic compound is affected by the water content in the polymerization reaction system. Generally, a dehydration step is inserted before the polymerization step so as to adjust the water content in the polymerization reaction system.

In the preferred manufacturing method of the present invention, the dehydration step 1 (hereafter abbreviated as "dehydration step") includes heating a mixture containing an organic amide solvent, a sulfur source including an alkali metal hydrosulfide and an alkali metal hydroxide, and discharging at least part of the distillate containing water from the inside of the system containing the mixture to the outside of the system. An organic amide solvent is used as the medium used in the dehydration step. The organic amide solvent used in the dehydration step is preferably the same as the organic amide solvent used in the polymerization step. From the viewpoint of being industrially easily available, NMP is more preferred. The amount of the organic amide solvent is typically from 0.1 to 10 kg, and preferably from 0.15 to 5 kg per mol of sulfur source to be charged in the reaction vessel.

The dehydration operation is performed by heating the mixture formed by adding the raw materials to the reaction vessel typically at a temperature of 300° C. or less and preferably within the temperature range of 100 to 250° C., typically for 15 minutes to 24 hours and preferably for 30 minutes to 10 hours. In the dehydration step, the water and organic amide solvent are vaporized by heating and distilled. Thus, the water and organic amide solvent are included in the distillate. Part of the distillate may be returned to the system to prevent the distillate from being discharged outside of the system of the organic amide solvent. In order to adjust the water content, at least part of the distillate containing water is discharged to the outside of the system. When the distillate is discharged to the outside of the system, a very small amount of organic amide solvent is discharged together with water to the outside of the system.

In the dehydration step, the hydrogen sulfide from the sulfur source is vaporized. The vaporized hydrogen sulfide is discharged to the outside of the system when at least part of the distillate containing water is discharged to the outside of the system.

In the dehydration step, the water content including hydrated water or an aqueous medium, byproduct water, or the like is dehydrated until the water content is in a range of the amount required. In the dehydration step, it is preferable to perform the dehydration step until the water content is typically from 0.01 to 2 mol, preferably from 0.5 to 1.7 mol, more preferably from 0.8 to 1.65 mol, and even more preferably from 0.9 to 1.6 mol per mol of effective sulfur source, which is the sulfur source present in the polymerization reaction system after the dehydration step. When the water content is excessively decreased in the dehydration step, the water content can be adjusted to a desired water content by adding water in the charging step.

In the dehydration step, it is preferable to heat a mixture containing an organic amide solvent, a sulfur source including an alkali metal hydrosulfide and an alkali metal hydroxide (in an amount of 0.9 to 1.1 mol, preferably from 0.91 to 1.08 mol, more preferably from 0.92 to 1.07 mol, and even more preferably from 0.93 to 1.06 mol per mol of sulfur source) and discharge at least part of the distillate containing water from the inside of the system containing the mixture to the outside of the system.

The hydrogen sulfide is discharged as gas to the outside of the system.

10.2. Charging Step 2:

The charging step 2 (hereafter, sometimes simply abbreviated as "charging step") is a charging step including mixing the mixture remaining inside the system in the dehydration step with a dihalo aromatic compound to prepare a charged mixture containing an organic amide solvent, a sulfur source (charged sulfur source), an alkali metal hydroxide, water and a dihalo aromatic compound, wherein the amount of the dihalo aromatic compound in the charged mixture is from 0.95 to 1.02 mol per mol of charged sulfur source. Generally, the content and quantitative ratio of each of the components are varied in the dehydration step. Accordingly, the amount of each of the components amount in the charging step needs to be adjusted taking into consideration the amount of each of the components in the mixture obtained in the dehydration step.

In the manufacturing method of the present invention, it is preferable to prepare a charged mixture containing the following components: 0.95 to 1.09 mol of an alkali metal hydroxide, 0.01 to 2 mol of water and 0.95 to 1.02 mol of a dihalo aromatic compound per mol of charged sulfur source in the charging step.

In the present invention, the amount of the "charged sulfur source" (effective sulfur source), which is the sulfur source present in the polymerization reaction system after the dehydration step, can be calculated by subtracting the "molar amount of the hydrogen sulfide vaporized in the dehydration step" from the "molar amount of the sulfur source charged in the dehydration step".

The quantitative ratio (molar ratio) of each of the components in the charged mixture is adjusted by typically adding a necessary component to the mixture obtained in the dehydration step. The dihalo aromatic compound is added to the mixture in the charging step. When the amount of alkali metal hydroxide or water in the mixture obtained in the dehydration step is too small, these components are added in the charging step. When the distillation amount of the organic amide solvent in the dehydration step is too large, the organic amide solvent is added in the charging step. In order to adjust the charged sulfur source, a sulfur source may be added in the charging step. Thus, in the charging step, a sulfur source, an organic amide solvent, water and an alkali metal hydroxide may be added as necessary in addition to the dihalo aromatic compound.

When the molar ratio of the alkali metal hydroxide per mol of charged sulfur sources is too large, the deterioration of the organic amide solvent may be increased or an abnormal reaction during polymerization may be caused. Further, this tends to cause a decrease in yield or quality of the branched PAS resin being formed. When the sulfur source containing an alkali metal hydrosulfide is used as the sulfur source, the molar amount of the alkali metal hydroxide per mol of charged sulfur source is from 0.95 to 1.09 mol, preferably from 0.98 to 1.085 mol, more preferably from 0.99 to 1.083 mol, and even more preferably from 1.0 to 1.08 mol. In this case, the amount of the alkali metal hydroxide is the total amount of the alkali metal hydroxide charged in the dehydration step 1, the alkali metal hydroxide formed with the generation of the hydrogen sulfide vaporized in the dehydration step 1 and the alkali metal hydroxide to be added in the charging step 2.

In the prestage polymerization step 3 described below, the molar ratio of the alkali metal hydroxide per mol of charged sulfur source is within the above range so that the polymerization reaction is stably carried out and a high-quality branched PAS resin is easily obtained.

In the charging step, it is preferable to adjust the molar amount so that the molar amount of water per mol of charged sulfur source is from 0.01 to 2 mol, preferably from 0.6 to 1.8 mol, more preferably from 0.9 to 1.7 mol, and even more preferably from 1.0 to 1.65 mol. In this case, the amount of water is determined by taking into consideration the water formed with the generation of the alkali metal sulfide in the dehydration step 1 and the water consumed with the vaporization of the hydrogen sulfide in the dehydration step 1. When the amount of coexisting water is too small in the prestage polymerization step 3, undesirable reactions such as decomposition reactions of the formed polymer is likely to occur. When the amount of coexisting water is too large, the polymerization reaction rate becomes significantly slow, or decomposition reactions occur.

In the charging step, it is preferable to prepare a charged mixture containing a dihalo aromatic compound in an amount of from 0.95 to 1.02 mol, preferably from 0.96 to 1.01 mol, more preferably from 0.97 to 1.0 mol, and even more preferably from 0.98 to 0.999 mol per mol of charged sulfur source, and more preferably in an amount of from 0.985 to 0.998 mol, and even more preferably from 0.986 to 0.997 mol depending on the branched PAS resin. When the ratio of the dihalo aromatic compound is outside the above range, it becomes difficult to control the melt viscosity within a desired range, it becomes difficult to decrease the halogen content within a target range, or the melt viscoelasticity tan δ is outside a suitable range. Further, the reaction of the PAS in the middle of the polymerization with the disulfide compound and/or the polyhalo aromatic compound may not be stable.

As described above, one of the characteristics of the present invention is that the ratio of the dihalo aromatic compound to the sulfur source is controlled so as to be decreased.

In the charging step, the amount of the organic amide solvent is typically from 0.1 to 10 kg, preferably from 0.13 to 5 kg, more preferably from 0.15 to 2 kg per mol of charged sulfur source.

10.3. Prestage Polymerization Step 3:

The prestage polymerization step 3 in the preferred manufacturing method of the present invention (hereinafter, simply abbreviated as "prestage polymerization step") includes heating a charged mixture to a temperature of from 170 to 270° C. and performing a polymerization reaction of a charged sulfur source and a dihalo aromatic compound in a water-containing organic amide solvent; adding a disulfide compound in an amount of from 0.001 to 0.03 mol per mol of charged sulfur source during the time interval between a stage when the conversion ratio of the dihalo aromatic compound is 0% and a stage when a polyhalo aromatic compound is added, and reacting the mixture; and adding the polyhalo aromatic compound to the polymerization reaction mixture in an amount of 0.002 to 0.06 mol per mol of charged sulfur source and an amount of 0.2 to 12 mol per mol of disulfide compound at a stage when the conversion ratio of the dihalo aromatic compound reaches 80% or greater.

As described above, one of the characteristics of the present invention is that the disulfide compound is added in an amount of from 0.001 to 0.03 mol per mol of charged sulfur source during the time interval between a stage when the conversion ratio of the dihalo aromatic compound at the start of the polymerization is 0% and a stage when the polyhalo aromatic compound is added.

The disulfide compound is added in an amount of from 0.001 to 0.03 mol, preferably from 0.0015 to 0.02 mol, and more preferably from 0.002 to 0.015 mol per mol of charged sulfur source. When the amount of the disulfide compound is too small, the amount of substitution of the cleaved disulfide compound for the terminals of the PAS in the middle of the polymerization is insufficient. Thus, the melt viscosity of the branched PAS resin to be obtained is not low and it becomes difficult to reduce the halogen content. When the amount of the disulfide compound is too large, the melt viscosity is excessively decreased, whereby the processability is deteriorated and it becomes difficult to suppress generation of burrs.

The addition stage of the disulfide compound may be any stage as long as it is during the time interval between a stage when the conversion ratio of the dihalo aromatic compound is 10% and a stage when the polyhalo aromatic compound is added. It is preferably during the time interval between a stage when the conversion ratio of the dihalo aromatic compound is 0% and a stage when the polyhalo aromatic compound is added, more preferably during the time interval between a stage when the conversion ratio of the dihalo aromatic compound is 30% and a stage when the polyhalo aromatic compound is added, even more preferably during the time interval between a stage when the conversion ratio of the dihalo aromatic compound is 50% and a stage when the polyhalo aromatic compound is added, and yet even more preferably during the time interval between a stage when the conversion ratio of the dihalo aromatic compound is 70% and a stage when the polyhalo aromatic compound is added.

Based on various characteristics such as target melt viscosity of the branched PAS resin, halogen content, melt viscoelasticity tan δ, thermal stability and processability, it is important to adjust the amount of the disulfide compound to be added and the addition stage.

In the polymerization reaction field, the reaction time required for the added disulfide compound is about from 10 minutes to 5 hours, preferably from 15 minutes to 4 hours, more preferably from 18 minutes to 3 hours, and even more preferably from 20 minutes to 2 hours.

The conversion ratio of the dihalo aromatic compound is from 75 to 99%, preferably from 80 to 98.5%, more preferably from 83 to 98%, and even more preferably from 85 to 97.5%.

The conversion ratio of the dihalo aromatic compound is important to control the molecular weight of a polymer used as a group for obtaining the target melt viscosity. At a stage when the conversion ratio of the dihalo aromatic compound is 75% or greater, the weight average molecular weight of the produced polymer (prepolymer) included in the polymerization reaction mixture is typically 6,000 or greater.

The amount of the dihalo aromatic compound remaining in the reaction mixture is determined by gas chromatography, and the conversion ratio of the dihalo aromatic compound can be calculated based on this remaining amount, the charged amount of the dihalo aromatic compound, and the charged amount of the sulfur source. When the dihalo aromatic compound (abbreviated as "DHA") is added in a greater molar amount than the sulfur source, the conversion ratio is calculated using the following formula 1:

Conversion ratio=[DHA charged amount (mol)−DHA remaining amount (mol)]/[DHA charged amount (mol)−DHA excess amount (mol)]  (1)

In other cases, the conversion ratio is calculated using the following formula 2:

Conversion ratio=[DHA charged amount (mol)−DHA remaining amount (mol)]/[DHA charged amount (mol)]  (2)

In the manufacturing method of the present invention, a polymerization reaction is performed by adding the polyhalo aromatic compound (in an amount of from 0.002 to 0.06 mol per mol of charged sulfur source and an amount of from 0.2 to 12 mol per mol of disulfide compound) to the polymerization reaction mixture, at a stage when the conversion ratio of the dihalo aromatic compound is 80% or greater.

Preferably, the addition stage of the polyhalo aromatic compound is a stage when the conversion ratio of the dihalo aromatic compound is 80% or greater. More preferably, the addition stage is a stage when the conversion ratio of the dihalo aromatic compound is from 80 to 99%, preferably from 83 to 99%, and more preferably from 85 to 98%.

The amount of the polyhalo aromatic compound to be added is from 0.002 to 0.06 mol, preferably from 0.008 to 0.05 mol, and more preferably from 0.011 to 0.04 mol per mol of charged sulfur source.

When the amount of the polyhalo aromatic compound to be added is small, the formation of a branched structure becomes insufficient. Even if the obtained PAS is used as a polymer modifier, characteristics serving as a burr suppressor may not be sufficient. On the other hand, when the amount of the polyhalo aromatic compound to be added is large, the melt viscosity is increased and the melt viscoelasticity tan δ may be outside the target range.

In the manufacturing method of the present invention, the melt viscosity and melt viscoelasticity tan δ are within an appropriate range and further a branched PAS resin having a low halogen content is obtained. To achieve this, as described above, it is important to adjust the amount of the polyhalo aromatic compound to be added within the range of from 0.002 to 0.06 mol per mol of charged sulfur source and the range of from 0.2 to 12 mol per mol of disulfide compound as described above.

Hence, it is necessary to adjust the amount of the polyhalo aromatic compound to be added within the range of from 0.2 to 12 mol, preferably from 0.5 to 11.5 mol, more preferably from 1 to 11 mol, even more preferably from 1.5 to 10.5 mol, and yet even more preferably from 2 to 10 mol per mol of disulfide compound.

The ratio of the amount of the polyhalo aromatic compound to the disulfide compound is deemed to be an important indicator to determine a balance between the substitution level of the cleavage of the disulfide compound for the terminals of the PAS polymer and the branched degree of the polyhalo aromatic compound. When this ratio is within the above range, the branched PAS resin of the present invention having an appropriate melt viscosity and melt viscoelasticity tan δ can be obtained.

When the ratio is less than 0.2 mol, it becomes difficult to generate branched structures and thus it becomes difficult to introduce a target branched structure.

When the ratio is greater than 12 mol, the melt viscosity is excessively increased. The melt viscoelasticity tan δ may be decreased.

In the polymerization reaction field, the reaction time required for the added polyhalo aromatic compound is about from 5 minutes to 3 hours, preferably from 7 minutes to 2.5 hours, more preferably from 8 minutes to 2.25 hours, and even more preferably from 10 minutes to 2 hours.

When the polyhalo aromatic compound is added at a stage when the conversion ratio of the dihalo aromatic compound is less than 80%, the melt viscosity of the branched PAS resin to be obtained tends to be high, whereas the melt viscoelasticity tan δ is excessively decreased and the burr suppressing effect becomes insufficient.

The important thing is that when the polyhalo aromatic compound is added, the amount of the polyhalo aromatic compound to be added is adjusted so that the total of the halogen content in the dihalo aromatic compound and the halogen content in the polyhalo aromatic compound is from 1.01 to 1.05 mol, preferably from 1.011 to 1.045 mol, more preferably from 1.012 to 1.043 mol, and even more preferably from 1.015 to 1.04 mol per mol of charged sulfur source, in the polymerization reaction field.

In this case, for example, when 1,2,4-trichlorobenzene (TCB) is used as the polyhalo aromatic compound, the total amount of 1.5 fold of the molar amount of the polyhalo aromatic compound and the molar amount, for example, when p-dichlorobenzene (pDCB) is used as the dihalo aromatic compound is the total amount of the amount of halogen (chlorine). In other words, it is a value obtained by dividing the total amount of 2 fold of pDCB/S and 3 fold of TCB/S by 2.

When the amount of the polyhalo aromatic compound is too large, the melt viscosity of the branched PAS resin is increased and the melt viscoelasticity tan δ is excessively decreased, whereby the burr suppressing effect is reduced and further the processability is deteriorated. When the amount of the polyhalo aromatic compound is too small, the introduction of the branched structure becomes insufficient and the burr suppressing effect is impaired.

In the poststage polymerization step 4 described below, the main purpose is to perform the phase separation polymerization reaction in the liquid-liquid phase separation state in the presence of the phase separation agent. Thus, the phase separation agent may be added in the prestage polymerization step 3.

Generally, a liquid-liquid phase separation state can be formed by increasing the temperature of the polymerization system in the presence of the phase separation agent. The time of adding the phase separation agent varies depending on the kind and amount of the phase separation agent. For example, when the phase separation agent is water, the phase separation agent is added at a stage when the conversion ratio of the dihalo aromatic compound in the prestage polymerization step reaches 80% or greater. Organic carboxylic acid salts, alkali metal halides or the like may be added before or in early stages of polymerization. In this case, the reaction system is converted to a phase separation state by increasing the temperature during the poststage polymerization.

The phase separation agent may be added simultaneously with the polyhalo aromatic compound or may be added after addition of the polyhalo aromatic compound. For example, the polyhalo aromatic compound is added to the polymerization reaction mixture at a stage when the conversion ratio of the dihalo aromatic compound reaches 80% or greater. Thereafter, the phase separation agent can be added at a stage when the conversion ratio of the dihalo aromatic compound is 99% or less and preferably 98% or less.

As the phase separation agent, the above-described alkali metal carboxylic salts or water can be used, and preferably water is used. It is preferable to use water because the cost is low and it is easy to perform the posttreatment.

When the phase separation agent is water, it is preferable to add water to the polymerization reaction mixture so that the water content in the polymerization reaction mixture (total water content) is greater than 2 mol and less than or equal to 10 mol, preferably from 2.3 to 7 mol, and more preferably from 2.5 to 5 mol per mol of charged sulfur source.

When water and another phase separation agent other than water is used as the phase separation agent, it is preferable that the water content (total amount) in the polymerization reaction mixture is from 0.01 to 7 mol, preferably from 0.1 to 6 mol, and more preferably from 1 to 4 mol per mol of charged sulfur source and the existing amount of another phase separation agent other than water is from 0.01 to 3 mol, preferably from 0.02 to 2 mol, and more preferably from 0.03 to 1 mol. In this case, another phase separation agent other than water may be added at any stage from before the polymerization to the prestage polymerization.

In the poststage polymerization step 4 described below, the temperature is increased in the presence of the phase separation agent, whereby the polymerization reaction is typically continued in a state in which a phase separation to a polymer dense phase and a polymer dilute phase takes place. When the amount of the phase separation agent to be added is too small or the temperature is too low, it becomes difficult to perform the phase separation polymerization or it becomes difficult to obtain a branched PAS resin having desired characteristics. When the existing amount of the phase separation agent is too large, it takes a long time for the polymerization reaction to be completed or it becomes difficult to form a granular polymer.

The polymerization reaction time in the prestage polymerization step (in total with the polymerization time in the poststage polymerization step 4 described below) is typically in a range of from 10 minutes to 72 hours, preferably in a range of from 0.5 to 48 hours, more preferably in a range of from 0.5 to 15 hours, and even more preferably in a range of from 1 to 12 hours.

In the prestage polymerization step, the polymerization reaction is started by heating the charged mixture to preferably a temperature of from 170 to 270° C., more preferably a temperature of from 180 to 240° C., and even more preferably a temperature of from 190 to 235° C.

10.4. Poststage Polymerization Step 4:

The poststage polymerization step 4 (hereinafter may be abbreviated as "poststage polymerization step") is described below.

The poststage polymerization step is a step that includes heating a polymerization reaction mixture, increasing the temperature to a temperature of 240° C. or higher, and performing the phase separation polymerization reaction in the presence of the phase separation agent at a temperature of from 240 to 290° C., and is a very important step to manage the growth of polymer in the polymer dense phase and the development of the branched structure of polymer in the polymer dense phase.

In the poststage polymerization step of the manufacturing method of the present invention, the phase separation polymerization reaction is continued in a state in which the reaction mixture is phase separated into a polymer dense phase and a polymer dilute phase. Generally, the phase separation polymerization reaction is performed while stirring. Thus, the phase separation polymerization reaction is actually performed in a state in which the polymer dense phase is dispersed as droplets in an organic amide solvent (polymer dilute phase).

Hence, in the poststage polymerization step, the polymer dilute phase and the polymer dense phase are present in a liquid-liquid phase separation state, the onset and growth of chain branching reaction of the polyhalo aromatic compound with the PAS polymer proceeds mainly in the polymer dense phase, the bonding of the PAS polymers during the growth reaction efficiently increases the molecular weight, and thus a branched structure is formed.

In the manufacturing method of the present invention, the poststage polymerization step is an important step to obtain a branched PAS resin having a target melt viscosity value, low halogen content and characteristics in the melt viscoelasticity tan δ.

In the poststage polymerization step, the polymerization reaction is continued at a temperature of from 240 to 290° C. and preferably a temperature of from 245 to 270° C. Although the polymerization temperature can be maintained at a constant temperature, it may be gradually increased or decreased as needed.

The polymerization reaction time (in total with the polymerization time in the prestage polymerization step) is typically in a range of from 10 minutes to 72 hours and preferably in a range of from 30 minutes to 48 hours. The polymerization time in the poststage polymerization step is in a range of from 2 to 10 hours in many cases.

11. Posttreatment Step:

The posttreatment after the polymerization reaction can be carried out in accordance with an ordinary manner. For example, when the polymerization reaction mixture is cooled after the completion of polymerization reaction, a slurry containing a produced polymer is obtained. The branched PAS resin can be recovered by filtering the cooled slurry directly or after dilution with water, repeating the washing and filtering cycle, and finally drying the resulting product.

According to the manufacturing method of the present invention, it is possible to form a granular polymer. Thus, the granular polymer can be separated from the slurry by sieving using a screen. In the separation step, byproducts having a very high halogen content or oligomers can be easily separated. As a result, a PAS having a low halogen content is obtained, which is preferable. The granular polymer may be directly screened from the slurry at a high temperature.

Sieving is typically performed using a 100 mesh screen (with a sieve opening of 150 μm). In the case of sieving with a 100 mesh screen (with a sieve opening of 150 μm), the yield is typically 70% or greater and preferably 75% or greater.

After the sieving, the polymer is preferably washed with the same organic amide solvent as the polymerization solvent, ketone (e.g., acetone) or an organic solvent such as alcohols (e.g., methanol). The polymer may be washed with high temperature water or the like. The polymer can be treated with a salt such as acid or ammonium chloride. When the average particle size of the formed granular polymer is too large, a grinding step may be inserted to give a desired average particle size. The granular polymer can also be ground and/or classified.

12. Branched PAS Resin Including —S— Substituent Group with Cleaved Disulfide Compound:

According to the manufacturing method of the present invention, it is possible to obtain a branched PAS resin including an —S— substituent group with a cleaved disulfide compound, wherein the resin has the following characteristics i to iii:

i) a halogen content of 4,000 ppm or less;
ii) a melt viscosity as measured at a temperature of 330° C. and a shear rate of 2 $\sec^{-1}$ of $1.0 \times 10^4$ to $50.0 \times 10^4$ Pa·s; and
iii) a melt viscoelasticity tan δ as measured at a temperature of 310° C. and an angular velocity of 1 rad/sec of 0.1 to 0.6.

The halogen content of the branched PAS resin including an —S— substituent group with a cleaved disulfide compound of the present invention is preferably 3,000 ppm or less, more preferably 2,000 ppm or less, even more preferably 1,800 ppm or less, and yet even more preferably 1,700 ppm or less. Depending on the intended use of the branched PAS resin, the halogen content is preferably 1,600 ppm or less and more preferably 1,500 ppm or less.

The melt viscosity A of the branched PAS resin including an —S— substituent group with a cleaved disulfide compound of the present invention (as measured at a temperature of 330° C. and a shear rate of 2 $\sec^{-1}$) is preferably from $2.0 \times 10^4$ to $48.0 \times 10^4$ Pa·s, more preferably from $2.5 \times 10^4$ to $47.5 \times 10^4$ Pa·s, and even more preferably from $3.0 \times 10^4$ to $47.0 \times 10^4$ Pa·s. When the melt viscosity of the branched PAS resin is too high, the burr suppressing effect becomes insufficient and the surface properties of the molded product are deteriorated. When the melt viscosity of the branched PAS resin is too low, the burr suppressing effect becomes poor.

Additionally, in the present invention, the melt viscosity B is measured (at a temperature of 310° C. and a shear rate of 1,200 sec$^{-1}$).

Generally, when the measurement temperature is high, the melt viscosity to be measured is low, whereas when the shear rate is high, the melt viscosity to be measured is low.

The melt viscoelasticity tan δ of the branched PAS resin including an —S— substituent group with a cleaved disulfide compound of the present invention (as measured at a temperature of 310° C. and an angular velocity of 1 rad/sec) is preferably from 0.11 to 0.58, more preferably from 0.12 to 0.57, and even more preferably from 0.13 to 0.56. The melt viscoelasticity tan δ of the branched PAS resin is within the above range so that an excellent burr suppressing effect is obtained. When the melt viscoelasticity tan δ of the branched PAS resin is too low or too high, the burr suppressing effect becomes poor.

The melt viscoelasticity tan δ of an extremely high-molecular weight linear PAS resin or a conventional PAS resin with a crosslinked structure typically has a value lower than 0.10 depending on the level of crosslinking. On the other hand, the melt viscoelasticity tan δ of a significantly low-molecular weight PAS resin typically has a value greater than 0.6.

The average particle size of the branched PAS resin including an —S— substituent group with a cleaved disulfide compound of the present invention is preferably from 60 to 1,500 μm, more preferably from 100 to 1,300 μm, even more preferably from 150 to 1,000 μm, and yet even more preferably from 200 to 950 μm.

In order to adjust the average particle size of the branched PAS resin, the branched PAS resin obtained by polymerization may be ground and/or classified. When the average particle size of the branched PAS resin is too small, it becomes difficult to handle or meter. When the average particle size of the branched PAS resin is too large, the surface properties of the molded product are impaired and it is difficult to be blended with another resin such as the linear PAS resin.

Preferably, the branched PAS resin including an —S— substituent group with a cleaved disulfide compound of the present invention is blended with the linear PAS resin as a polymer modifier and the resultant mixture is used as a burr suppressor. The linear PAS resin is a PAS resin obtained as a high-molecular weight polymer during the polymerization. In this regard, however, the linear PAS resin may include a slightly branched or crosslinked structure which is a byproduct formed during the polymerization.

The linear PAS resin is preferably a linear PPS resin having a melt viscosity as measured at a temperature of 310° C. and a shear rate of 1,216 sec$^{-1}$ of typically from 5 to 1,500 Pa·s, preferably from 10 to 1,000 Pa·s, and more preferably from 15 to 500 Pa·s.

In the present invention, it is preferable to prepare a resin composition by adding 1 wt. part to 50 wt. parts of the branched PAS resin to 100 wt. parts of the linear PAS resin. The ratio of the branched PAS resin is preferably from 5 to 40 wt. parts.

To this resin composition, various organic or inorganic fillers can be added. Any filler used in the field, such as a powdery or granular filler or a fibrous filler, can be used. Among them, fibrous inorganic fillers such as glass fibers and carbon fibers are preferred.

The ratio of the filler is typically 400 wt. parts or less, preferably 350 wt. parts or less, and more preferably 300 wt. parts or less with respect to 100 wt. parts of the linear PAS resin. When the filler is added, the lower limit is typically 0.01 wt. part with respect to 100 wt. parts of the linear PAS resin and is 0.1 wt. part in many cases. The ratio of the filler can be determined within the above range, if appropriate, depending on the intended use thereof.

EXAMPLES

The present invention will be more specifically described hereinafter with reference to working examples and comparative examples. The method for measuring physical properties and characteristics is as follows.
(1) Method for Measuring Halogen Content
The chlorine content was measured by combustion ion chromatography as the halogen content in the sample polymer.
(Measurement Conditions)
Ion chromatograph: DX320 manufactured by DIONEX
Pretreatment devices for combustion: AQF-100, ABC, WS-100 and GA-100, manufactured by Mitsubishi Chemical Corporation
Sample: 10 mg
Heater: Inlet Temp/900° C., Outlet Temp/1000° C.
Absorption solution: $H_2O_2$ 900 ppm, internal standard: $PO_4^{3-}$ 25 ppm
(2) Yield:
The yield of the polymer was obtained by using the polymer weight (theoretical amount) when the total amount of the effective sulfur component (effective S) present in the reactor after the dehydration step was assumed to be converted to a polymer as a standard value and calculating the ratio (wt %) of the actual weight of the polymer recovered to the standard value.
(3) Melt Viscosity:
(3-1) Melt Viscosity A:
The melt viscosity of a sample (about 10 g of polymer) was measured with Capirograph 1-C (manufactured by Toyo Seiki Seisaku-sho, Ltd.). At that time, the used capillary was a die with an entrance angle (2.095 mm in diameter and 8.04 mm in length). The measurement temperature was 330° C. The polymer sample was placed in the device and kept for 5 minutes. Thereafter, the melt viscosity was measured at a shear rate of 2 sec$^{-1}$. The melt viscosity is referred to as "melt viscosity A".
(3-2) Melt Viscosity B
The melt viscosity of a sample (about 10 g of polymer) was measured with Capirograph 1-C (manufactured by Toyo Seiki Seisaku-sho, Ltd.). The used capillary was a flat die (1 mm in diameter and 10 mm in length). The measurement temperature was 310° C. The polymer sample was placed in the device and kept at 310° C. for 5 minutes. Thereafter, the melt viscosity was measured at a shear rate of 1,200 sec$^{-1}$. The melt viscosity is referred to as "melt viscosity B".
(4) Melt Viscoelasticity (Tan δ):
A sample (about 3 g of polymer) was hot pressed in a circular mold having a diameter of 2 cm at 320° C. and quenched with ice water to produce a test piece for rheometer measurement. The melt viscoelasticity was measured using a parallel plate rheometer (RDSII, manufactured by Rheometric Scientific, Inc.) at a measurement temperature of 310° C. and an angular velocity ω of 1 rad/sec.
(5) Burr Characteristics
To 100 wt. parts of linear PPS resin having a melt viscosity 30 Pa·s as measured at a temperature of 310° C.

and a shear rate of 1,200 sec$^{-1}$, 20 wt. parts of a sample polymer and 80 wt. parts of a glass fiber (of 13 μm in diameter and 3 mm in length, manufactured by Nippon Electric Glass Co., Ltd.) were added, which was mixed for 2 minutes. This mixture was fed to a biaxial extruder at a cylinder temperature of 320° C. to produce a resin composition pellet. This pellet was injected into a metal mold for evaluation of burrs having a cavity with a diameter of 70 mm and a thickness of 3 mm at the minimum pressure that the resin composition was completely filled into the mold. The injection molding conditions are described below.

<Injection Molding Conditions>
Injection molder: IS-75E, manufactured by TOSHIBA MACHINE CO., LTD
Cylinder temperature conditions: NH/H1/H2/H3/H4=310/320/310/300/290 (° C.)
Metal mold temperature: 140° C.

<Measurement of Burr Length>
The length of burr on a 20 μm×5 mm slit (burr length) formed around the metal mold was measured using an enlarging projector. The shorter the length of burr the more excellent the burr suppressing effect (burr characteristics).

(6) Surface Properties of Molded Product
Both surfaces of a molded product for evaluation of burrs (a disk with a diameter of 70 mm and a thickness of 3 mm) were visually observed and evaluated based on the following criteria:
A: the number of small recesses having a crater shape is 4 or less;
B: the number of recesses having a crater shape is from 5 to 20; and
C: the number of recesses having a crater shape is 21 or greater.

(7) Yield
The yield of the polymer was obtained by using the polymer weight (theoretical amount) when the total amount of the effective sulfur component (effective S) present in the reactor after the dehydration step was assumed to be converted to a polymer as a standard value and calculating the ratio (wt %) of the actual weight of the polymer recovered to the standard value.

(8) Average Particle Size
Nine sieves of a sieve having a mesh size of 200, a sieve having a mesh size of 150, a sieve having a mesh size of 100, a sieve having a mesh size of 60, a sieve having a mesh size of 32, a sieve having a mesh size of 24, a sieve having a mesh size of 16, a sieve having a mesh size of 12 and a sieve having a mesh size of 7 are stacked in this order, a polymer was placed on the top of the stacked sieves, and the average particle size was measured in accordance with JIS K-0069.

Working Example 1

(1) Dehydration Step:
1,950 g of a sodium hydrosulfide (NaSH) solution with a concentration of 61.8 wt % as analyzed by iodometry (NaSH unit: 21.50 mol), 1,191 g of a sodium hydroxide (NaOH) solution with a concentration of 73.7 wt % (NaOH unit: 21.94 mol) and 6,000 g of N-methyl-2-pyrrolidone (hereinafter abbreviated as "NMP") were charged into a 20 L titanium lined autoclave with a stirrer (hereinafter abbreviated as "reactor").

The inside of the reactor was replaced with nitrogen gas. Thereafter, the temperature of the reactor was increased to 200° C. over about 4 hours while the reactor was stirred. Thus, 985 g of water and 891 g of NMP were distilled. At that time, 12.5 g of hydrogen sulfide (H$_2$S) (0.37 mol) was flowed (vaporized). Therefore, the amount of effective S in the reactor after the dehydration step was 21.13 mol (the effective amount of S corresponds to the charged sulfur source).

(2) Charging Step:
After the dehydration step, the content remaining in the reactor including the effective S (21.13 mol) was cooled to 150° C. 3,094 g of p-dichlorobenzene (hereinafter abbreviated as "pDCB") [the ratio of pDCB to the effective S=0.996 (mol/mol)], 2,603 g of NMP [added in such a manner that the ratio of NMP to the effective S in the reactor was 365 (g/mol)] and 170 g of water [added in such a manner that the ratio of the total amount of water to the effective S in the reactor was 1.62 (mol/mol) were added, and then 1.5 g (0.04 mol) of NaOH was added in such a manner that the ratio of NaOH to the effective S in the reactor was 1.075 (mol/mol). The NaOH (0.73 mol) generated when H$_2$S vaporized was included in the reactor.

(3) Polymerization Step:
The stirrer attached to the reactor was stirred at 250 rpm to perform a reaction at 220° C. for 8 hours. The conversion ratio of pDCB was 96%. Then, a mixture of 46.1 g of diphenyl disulfide (hereinafter abbreviated as "DPDS") and 340 g of NMP was injected into the reactor and reacted for 1 hour. The ratio of DPDS to the effective S was 0.010 (mol/mol). Further, the prestage polymerization was carried out by injecting a mixture of 100 g of 1,2,4-trichlorobenzene (hereinafter abbreviated as "TCB") [the ratio of TCB to the effective S=0.026 (mol/mol)] and 400 g of NMP into the reactor and reacting the resulting mixture for 15 minutes. At that time, the total amount of chlorine in pDCB and TCB was 1.035 mol per mol of effective S. The ratio of TCB to DPDS (mol/mol) was 2.6.

After that, the poststage polymerization was carried out by increasing the number of rotations to 400 rpm, injecting 392 g of water into the reactor, increasing the temperature to 255° C., and reacting for 3 hours. The ratio of water to the effective S (mol/mol) was 2.65.

(4) Posttreatment Step:
After the completion of poststage polymerization, a reaction mixture was cooled to near room temperature. Then, the granular polymer was screened by passing the content through a 100 mesh screen (with a sieve opening of 150 μm). The separated polymer was washed 3 times with acetone and washed 3 times with water. The granular polymer was washed once with an acetic acid solution whose pH was adjusted to 4 and further washed 3 times with water, whereby a washed polymer was obtained. The washed polymer was dried at 100° C. one whole day and night. The yield of granular polymer was 82%. The average particle size was 633 μm.

The resulting branched PAS resin including an —S— substituent group with a cleaved disulfide compound had a melt viscosity A (as measured at a temperature of 330° C. and a shear rate of 2 sec$^{-1}$)) of 180,000 Pa·s, a melt viscosity B (as measured at a temperature of 310° C. and a shear rate of 1,200 sec$^{-1}$) of 1.019 Pa·s, a chlorine content of 1,000 ppm and a melt viscoelasticity tan δ of 0.27. The data was shown in Table 1.

Working Example 2

A polymer was produced in the same manner as in Working Example 1 except that the amount of DPDS in the polymerization step of Working Example 1 was 34.5 g and the ratio of DPDS to the effective S (mol/mol) was 0.0075.

The ratio of TCB to DPDS (mol/mol) was 3.5. The yield of granular polymer was 80%. The average particle size was 504 μm.

The resulting branched PAS resin including an —S— substituent group with a cleaved disulfide compound had a melt viscosity A of 300,000 Pa·s, a melt viscosity B of 1,427 Pa·s, a chlorine content of 1,550 ppm and a melt viscoelasticity tan δ of 0.20. The data was shown in Table 1.

Working Example 3

A polymer was produced in the same manner as in Working Example 1 except that the amount of DPDS in the polymerization step of Working Example 1 was 23.1 g and the ratio of DPDS to the effective S (mol/mol) was 0.005. The ratio of TCB to DPDS (mol/mol) was 5.2. The yield of granular polymer was 78%. The average particle size was 320 μm.

The resulting branched PAS resin including an —S— substituent group with a cleaved disulfide compound had a melt viscosity A of 460,000 Pa·s, a chlorine content of 1,650 ppm and a melt viscoelasticity tan δ of 0.14. The melt viscosity B was too high to measure. The data was shown in Table 1.

Working Example 4

(1) Dehydration Step:

1,870 g of an NaSH solution with a concentration of 61.8 wt % as analyzed by iodometry (NaSH unit: 20.61 mol) and 1,071 g of an NaOH solution with a concentration of 73.7 wt % (NaOH unit: 19.73 mol) were charged together with 6,003 g of NMP into a reactor.

The inside of the reactor was replaced with nitrogen gas. Thereafter, the temperature of the reactor was increased to 200° C. over about 4 hours while the reactor was stirred. Thus, 920 g of water and 821 g of NMP were distilled. At that time, 8.0 g of $H_2S$ (0.23 mol) was flowed (vaporized). Therefore, the amount of effective S in the reactor after the dehydration step was 20.38 mol.

(2) Charging Step:

After the dehydration step, the content remaining in the reactor including the effective S (20.38 mol) was cooled to 150° C. 2,975 g of p-dichlorobenzene (hereinafter abbreviated as "pDCB") [the ratio of pDCB to the effective S=0.993 (mol/mol)], 2,248 g of NMP [added in such a manner that the ratio of NMP to the effective S in the reactor was 365 (g/mol)] and 150 g of water [added in such a manner that the ratio of the total amount of water to the effective S in the reactor was 1.60 (mol/mol) were added, and then 56 g (1.4 mol) of NaOH was added in such a manner that the ratio of NaOH to the effective S in the reactor was 1.060 (mol/mol). The NaOH (0.47 mol) generated when $H_2S$ vaporized was included in the reactor.

(3) Polymerization Step:

The stirrer attached to the reactor was stirred at 250 rpm to perform a reaction at 220° C. for 8 hours. The conversion ratio of pDCB was 96%. Then, a mixture of 44.4 g of DPDS and 313 g of NMP was injected into the reactor and reacted for 30 minutes. The ratio of DPDS to the effective S was 0.010 (mol/mol). Further, the prestage polymerization was carried out by injecting a mixture of 76 g of TCB [the ratio of TCB to the effective S=0.021 (mol/mol)] and 400 g of NMP into the reactor and reacting the resulting mixture for 1 hour. At that time, the total amount of chlorine in pDCB and TCB was 1.024 mol per mol of effective S.

The ratio of TCB to DPDS (mol/mol) was 2.06.

After that, the poststage polymerization was carried out by increasing the number of rotations to 400 rpm, injecting 513 g of water into the reactor, increasing the temperature to 255° C., and reacting for 3 hours. The ratio of water to the effective S (mol/mol) was 3.00.

(4) Posttreatment Step:

After the completion of poststage polymerization, a granular polymer was produced in the same manner as in Working Example 1. The yield of granular polymer was 82%. The average particle size was 870 μm.

The resulting branched PAS resin including an —S— substituent group with a cleaved disulfide compound had a melt viscosity A of 45,000 Pa·s, a melt viscosity B of 560 Pa·s, a chlorine content of 1,650 ppm and a melt viscoelasticity tan δ of 0.55.

The data was shown in Table 1.

Working Example 5

A polymer was produced in the same manner as in Working Example 4 except that the amount of DPDS in the polymerization step of Working Example 4 was 22.0 g and the ratio of DPDS to the effective S (mol/mol) was 0.005. The ratio of TCB to DPDS (mol/mol) was 4.2. The yield of granular polymer was 86%.

The average particle size was 403 μm.

The resulting branched PAS resin including an —S— substituent group with a cleaved disulfide compound had a melt viscosity A of 150,000 Pa·s, a melt viscosity B of 1,108 Pa·s, a chlorine content of 1,600 ppm and a melt viscoelasticity tan δ of 0.28. The data was shown in Table 1.

Working Example 6

A polymer was produced in the same manner as in Working Example 4 except that the amount of DPDS in the polymerization step of Working Example 4 was set to 6.6 g, whereby the ratio of DPDS to the effective S (mol/mol) was 0.0015, and the amount of TCB was set to 51.7 g, whereby the ratio of TCB to the effective S (mol/mol) was 0.014. The total amount of chlorine in pDCB and TCB was 1.014 mol per mol of effective S.

The ratio of TCB to DPDS (mol/mol) was 9.4.

The yield of granular polymer was 83%. The average particle size was 280 μm.

The resulting branched PAS resin including an —S— substituent group with a cleaved disulfide compound had a melt viscosity A of 130,000 Pa·s, a melt viscosity B of 1,372 Pa·s, a chlorine content of 1,400 ppm and a melt viscoelasticity tan δ of 0.40.

The data was shown in Table 1.

Comparative Example 1

(1) Dehydration Step:

1,871 g of an NaSH solution with a concentration of 61.8 wt % as analyzed by iodometry (NaSH unit: 20.63 mol) and 1,100 g of an NaOH solution with a concentration of 73.7 wt % (NaOH unit: 20.27 mol) were charged together with 6,501 g of NMP into a reactor.

The inside of the reactor was replaced with nitrogen gas. Thereafter, the temperature of the reactor was increased to 200° C. over about 4 hours while the reactor was stirred. Thus, 953 g of water and 878 g of NMP were distilled. At that time, 13.0 g of hydrogen sulfide ($H_2S$) (0.38 mol) was flowed (vaporized). Therefore, the amount of effective S in the reactor after the dehydration step was 20.24 mol.

(2) Charging Step:

After the dehydration step, the content remaining in the reactor including the effective S (24.24 mol) was cooled to 150° C. 3,190 g of pDCB [the ratio of pDCB to effective S=1.072 (mol/mol)], 3,100 g of NMP [the ratio of NMP to the effective S in the reactor=430 (g/mol)] and 151 g of water [the ratio of the total amount of water to the effective S in the reactor=1.54 (mol/mol)] were added [the ratio of NaOH to the effective S in the reactor=1.039 (mol/mol)]. The NaOH (0.76 mol) generated when $H_2S$ vaporized is included in the reactor.

(3) Polymerization Step:

The stirrer attached to the reactor was stirred at 250 rpm to perform a reaction at 220° C. for 3 hours. The conversion ratio of pDCB was 80%. Then, the prestage polymerization was carried out by injecting 125 g of TCB [the ratio of TCB to the effective S=0.034 (mol/mol)] and 406 g of NMP into the reactor and reacting the resulting mixture for 4 hours. At that time, the total amount of chlorine in pDCB and TCB was 1.123 mol per mol of effective S.

After that, the poststage polymerization was carried out by increasing the number of rotations to 400 rpm, injecting 603 g of water into the reactor, increasing the temperature to 255° C., and reacting for 4 hours. The ratio of water to the effective S (mol/mol) was 3.19.

(4) Posttreatment Step:

After the completion of poststage polymerization, a granular polymer was produced in the same manner as in Working Example 1. The yield of the thus obtained granular polymer was 85%. The average particle size was 597 μm.

The resulting branched PAS resin had a melt viscosity A of 280,000 Pa·s, a melt viscosity B of 750 Pa·s, a chlorine content of 6,500 ppm and a melt viscoelasticity tan δ of 0.15. The data was shown in Table 1.

Comparative Example 2

A polymer was produced in the same manner as in Working Example 1 except that the amount of DPDS in the polymerization step of Working Example 1 was 9.0 g and the ratio of DPDS to the effective S (mol/mol) was 0.002. The ratio of TCB to DPDS (mol/mol) was 13.4.

The yield of granular polymer was 56%. The average particle size was 240 μm.

The resulting branched PAS resin including an —S— substituent group with a cleaved disulfide compound had a melt viscosity A of 640,000 Pa·s, a chlorine content of 1,850 ppm and a melt viscoelasticity tan δ of 0.12. The melt viscosity B was too high to measure. The data was shown in Table 1.

Comparative Example 3

(1) Dehydration Step:

1,801 g of an NaSH solution with a concentration of 61.8 wt % as analyzed by iodometry (NaSH unit: 19.85 mol) and 1,080 g of an NaOH solution with a concentration of 73.7 wt % (NaOH unit: 19.90 mol) were charged together with 6,000 g of NMP into a reactor.

The inside of the reactor was replaced with nitrogen gas. Thereafter, the temperature of the reactor was increased to 200° C. over about 4 hours while the reactor was stirred. Thus, 861 g of water and 718 g of NMP were distilled. At that time, 6.0 g of hydrogen sulfide ($H_2S$) (0.18 mol) was flowed (vaporized). Therefore, the amount of effective S in the reactor after the dehydration step was 19.68 mol (2) Charging Step:

After the dehydration step, the content remaining in the reactor including the effective S (19.68 mol) was cooled to 150° C. 3,074 g of pDCB [the ratio of pDCB to the effective S=1.063 (mol/mol)], 3,580 g of NMP [added in such a manner that the ratio of NMP to the effective S in the reactor was 450 (g/mol)] and 110 g of water [added in such a manner that the ratio of the total amount of water to the effective S in the reactor was 1.62 (mol/mol) were added, and then 19.5 g of NaOH was added in such a manner that the ratio of NaOH to the effective S in the reactor was 1.054 (mol/mol). The NaOH (0.35 mol) generated when $H_2S$ vaporized is included in the reactor.

(3) Polymerization Step:

The stirrer attached to the reactor was stirred at 250 rpm to perform a reaction at 220° C. for 8 hours. The conversion ratio of pDCB was 90%. Then, the prestage polymerization was carried out by injecting 185 g of TCB [the ratio of TCB to the effective S=0.052 (mol/mol)] and 400 g of NMP into the reactor. At that time, the total amount of chlorine in pDCB and TCB was 1.140 mol per mol of effective S.

After that, the poststage polymerization was carried out by increasing the number of rotations to 400 rpm, injecting 589 g of water into the reactor, increasing the temperature to 255° C., and reacting for 4 hours. The ratio of water to the effective S (mol/mol) was 3.28.

(4) Posttreatment Step:

After the completion of poststage polymerization, a granular polymer was produced in the same manner as in Working Example 1. The yield of granular polymer was 76%. The average particle size was 623 μm.

The resulting branched PAS resin had a melt viscosity A of 105,000 Pa·s, a melt viscosity B of 521 Pa·s, a chlorine content of 9,000 ppm and a melt viscoelasticity tan δ of 0.28. The data was shown in Table 1.

Comparative Example 4

The dehydration step was the same as that of Comparative Example 3, and the preparation step, the polymerization step and the posttreatment step were as follows.

(2) Charging Step

After the dehydration step, the content remaining in the reactor including the effective S (19.68 mol) was cooled to 150° C. 2,997 g of pDCB [the ratio of pDCB to the effective S=1.036 (mol/mol)], 3,580 g of NMP [added in such a manner that the ratio of NMP to the effective S in the reactor was 450 (g/mol)], 49 g of TCB [the ratio of TCB to the effective S=0.014 (mol/mol)] and 115 g of water [added in such a manner that the ratio of the total amount of water to the effective S in the reactor was 1.63 (mol/mol) were added, and then 19.5 g of NaOH was added in such a manner that the ratio of NaOH to the effective S in the reactor was 1.054 (mol/mol). The NaOH (0.49 mol) generated when $H_2S$ vaporized is included in the reactor. At that time, the total amount of chlorine in pDCB and TCB was 1.057 mol per mol of effective S.

(3) Polymerization Step:

The stirrer attached to the reactor was stirred at 250 rpm to perform a reaction at 220° C. for 3 hours. The conversion ratio of pDCB was 90%. After that, the poststage polymerization was carried out by increasing the number of rotations to 400 rpm, injecting 892 g of water into the reactor, increasing the temperature to 255° C., and reacting for 1 hour. The ratio of water to the effective S (mol/mol) was 4.15.

(4) Posttreatment Step:

After the completion of poststage polymerization, a granular polymer was produced in the same manner as in Working Example 1. The yield of granular polymer was 80%. The average particle size was 477 μm.

The resulting branched PAS resin had a melt viscosity A of 240,000 Pa·s, a melt viscosity B of 1,210 Pa·s, a chlorine content of 4,300 ppm and a melt viscoelasticity tan δ of 0.37. The data was shown in Table 1.

Comparative Example 5

A polymer was produced in the same manner as in Comparative Example 4 except that the amount of pDCB in the preparation step of Comparative Example 4 was set to 3,065 g, whereby the ratio of pDCB to the effective S (mol/mol) was 1.060, and the amount of TCB was set to 108 g, whereby the ratio of TCB to the effective S (mol/mol) was 0.030.

At that time, the total amount of chlorine in pDCB and TCB was 1.105 mol per mol of effective S. The yield of granular polymer was 77%. The average particle size was 241 μm.

The resulting branched PAS resin had a melt viscosity A of 490,000 Pa·s, a chlorine content of 8,300 ppm and a melt viscoelasticity tan δ of 0.05. The melt viscosity B was too high to measure.

Comparative Example 6

(1) Dehydration Step:

2,000 g of an NaSH solution with a concentration of 61.8 wt % as analyzed by iodometry (NaSH unit: 22.05 mol) and 1,171 g of an NaOH solution with a concentration of 73.7 wt % (NaOH unit: 21.58 mol) were charged together with 6,001 g of NMP into a reactor.

The inside of the reactor was replaced with nitrogen gas. Thereafter, the temperature of the reactor was increased to 200° C. over about 4 hours while the reactor was stirred. Thus, 1014 g of water and 763 g of NMP were distilled. At that time, 5.5 g of hydrogen sulfide (H$_2$S) (0.16 mol) was flowed (vaporized). Therefore, the amount of effective S in the reactor after the dehydration step was 21.89 mol.

(2) Charging Step:

After the dehydration step, the content remaining in the reactor including the effective S (21.89 mol) was cooled to 150° C. 3,283 g of pDCB [the ratio of pDCB to the effective S=1.020 (mol/mol)], 2,760 g of NMP [added in such a manner that the ratio of NMP to the effective S in the reactor was 365 (g/mol)] and 189 g of water [added in such a manner that the ratio of the total amount of water to the effective S in the reactor was 1.62 (mol/mol)] were added, and then 43.0 g of NaOH was added in such a manner that the ratio of NaOH to the effective S in the reactor was 1.050 (mol/mol). The NaOH (0.32 mol) generated when H$_2$S vaporized is included in the reactor.

(3) Polymerization Step:

The stirrer attached to the reactor was stirred at 250 rpm to perform a reaction at 220° C. for 5 hours. The conversion ratio of pDCB was 92%.

Then, the prestage polymerization was carried out by injecting 14.3 g of DPDS and 762 g of NMP into the reactor and reacting the resulting mixture for 15 minutes. The ratio of DPDS to the effective S (mol/mol) was 0.003.

After that, the poststage polymerization was carried out by increasing the number of rotations to 400 rpm, injecting 397 g of water into the reactor, increasing the temperature to 255° C., and reacting for 5 hours. The ratio of water to the effective S (mol/mol) was 2.63.

(4) Posttreatment Step:

After the completion of poststage polymerization, a granular polymer was produced in the same manner as in Working Example 1. The yield of granular polymer was 89%. The average particle size was 436 μm.

The resulting PAS resin including an —S— substituent group with a cleaved disulfide compound had a melt viscosity B of 19 Pa·s and a chlorine content of 950 ppm. The melt viscoelasticity tan δ was too low to measure. The data was shown in Table 1.

Working Examples 1 to 6 and Comparative Examples 1 to 6 are arranged in Table 1.

TABLE 1

I

| | pDCB/S (mol/Smol) | Conversion ratio of pDCB (%) | TCB/S (mol/Smol) | DPDS/S (mol/Smol) | TCB/DPDS (mol/mol) |
|---|---|---|---|---|---|
| Working Example 1 | 0.996 | 96 | 0.026 | 0.010 | 2.6 |
| Working Example 2 | 0.996 | 96 | 0.026 | 0.0075 | 3.5 |
| Working Example 3 | 0.996 | 96 | 0.026 | 0.005 | 5.2 |
| Working Example 4 | 0.993 | 96 | 0.021 | 0.010 | 2.1 |
| Working Example 5 | 0.993 | 96 | 0.021 | 0.005 | 4.2 |
| Working Example 6 | 0.993 | 96 | 0.014 | 0.0015 | 9.4 |
| Comparative Example 1 | 1.072 | 80 | 0.034 | Not added | — |
| Comparative Example 2 | 0.996 | 96 | 0.026 | 0.002 | 13.4 |
| Comparative Example 3 | 1.063 | 90 | 0.052 | Not added | — |
| Comparative Example 4 | 1.036 | 90 | 0.014 (added in the charging step) | Not added | — |
| Comparative Example 5 | 1.060 | 90 | 0.030 (added in the charging step) | Not added | — |
| Comparative Example 6 | 1.020 | 92 | Not added | 0.003 | — |

II

| | Melt viscosity A (Pa · s) | Melt viscosity B (Pa · s) | Cl content (ppm) | Melt visco-elasticity tan δ | Burr length (μm) | Surface properties |
|---|---|---|---|---|---|---|
| Working Example 1 | 180,000 | 1,019 | 1,000 | 0.27 | 50 | A |
| Working Example 2 | 300,000 | 1,427 | 1,550 | 0.20 | 70 | A |
| Working Example 3 | 460,000 | Unmeasurable | 1,650 | 0.14 | 100 | B |
| Working Example 4 | 45,000 | 560 | 1,650 | 0.55 | 110 | A |
| Working Example 5 | 150,000 | 1,108 | 1,600 | 0.28 | 70 | A |
| Working Example 6 | 130,000 | 1,372 | 1,400 | 0.40 | 80 | A |
| Comparative Example 1 | 280,000 | 750 | 6,500 | 0.15 | 90 | A |

TABLE 1-continued

| | | | | | | |
|---|---|---|---|---|---|---|
| Comparative Example 2 | 640,000 | Unmeasurable | 1,850 | 0.12 | 150 | C |
| Comparative Example 3 | 105,000 | 521 | 9,000 | 0.28 | 150 | A |
| Comparative Example 4 | 240,000 | 1,210 | 4,300 | 0.37 | 170 | B |
| Comparative Example 5 | 490,000 | Unmeasurable | 8,300 | 0.05 | 180 | C |
| Comparative Example 6 | Unmeasurable | 19 | 950 | — | — | — |

[Discussion]

When a case of the present invention (Working Example 1 or 2) and a case in which the disulfide compound was not added (Comparative Example 1) are compared as examples having a certain level of melt viscosity, melt viscoelasticity tan δ and burr length characteristics, the case of the present invention (Working Example 1 or 2) is more excellent than the case in which the disulfide compound was not added (Comparative Example 1) in terms of the fact that the chlorine content is remarkably low and the burr length is short.

Comparative Example 2 is a case in which a small amount of the disulfide compound was added in the present invention (Working Examples 1, 2 and 3). In this case, particularly a ratio of the polyhalo aromatic compound to the disulfide compound being 12 or greater is outside the range of the present invention. The melt viscosity A of Comparative Example 2 is greater than the range of the present invention, thereby making it impossible to measure the melt viscosity B. It is clear that it is not practical as a burr suppressor. When a case of the present invention (Working Example 4) and a case in which the disulfide compound was not added (Comparative Example 3 or 4) are compared as examples having a certain level of low melt viscosity and high melt viscoelasticity tan δ, the case of the present invention (Working Example 4) is more excellent than the case in which the disulfide compound was not added (Comparative Example 3 or 4) in terms of the fact that not only the chlorine content is low but also the burr length is particularly short.

Particularly, despite the fact that the melt viscosity A of Working Example 4 is as remarkably low as 45,000 Pa·s, the burr length is 110 μm and an effect on the suppression of burrs is given.

When a case of the present invention (Working Example 3) and a case (Comparative Example 5) in which the disulfide compound was not added are compared as examples having a certain level of high melt viscosity, the present invention (Working Example 3) is excellent in terms of the fact that the chlorine content is low, and particularly the burr length is short.

Comparative Example 5 is a case in which the disulfide compound was not added and the polyhalo aromatic compound was added in the charging step, and is poor in terms of the fact that the chlorine content is high and the burr length is long.

Comparative Example 6 is a case in which the disulfide compound was added, but the polyhalo aromatic compound was not added, and is not a branched PAS resin. This case is poor in terms of the fact that the melt viscosity A is too low to measure.

INDUSTRIAL APPLICABILITY

In the branched PAS resin including an —S— substituent group with a cleaved disulfide compound of the present invention, the halogen (chlorine) content is low, it is possible to rationalize the melt viscosity and it is possible to realize a wider range of numerical value of melt viscoelasticity tan δ which is an indicator of branched structure. Further, the branched PAS resin including an —S— substituent group with a cleaved disulfide compound of the present invention is useful as the burr suppressor.

The branched PAS resin including an —S— substituent group with a cleaved disulfide compound of the present invention can be blended with another thermoplastic resin such as a linear PAS resin and formed into various molded products such as films, sheets and fibers by a general melt molding method such as injection molding, extrusion molding or compression molding. Further, the resin can be used as a material for resin parts in a wide range of fields including electrical and electric devices, automobile devices and chemical devices.

The invention claimed is:

1. A method for manufacturing a branched polyarylene sulfide resin including an —S— substituent group with a cleaved disulfide compound that polymerizes a sulfur source with a dihalo aromatic compound in an organic amide solvent in the presence of a disulfide compound and a polyhalo aromatic compound having three or more halogen substituent groups in the molecule, the method comprising the steps of:

performing a polymerization reaction of a sulfur source with a dihalo aromatic compound in an organic amide solvent using the dihalo aromatic compound in an amount of from 0.95 to 1.02 mol per mol of sulfur source;

adding a disulfide compound in an amount of from 0.001 to 0.03 mol per mol of sulfur source during the time interval between a stage when the conversion ratio of the dihalo aromatic compound is 50% and a stage when a polyhalo aromatic compound is added and reacting the mixture;

adding a polyhalo aromatic compound, in an amount of from 0.002 to 0.06 mol per mol of sulfur source and an amount of from 0.2 to 12 mol per mol of disulfide compound, to the polymerization reaction mixture at a stage when the conversion ratio of the dihalo aromatic compound reaches 80% or more; and performing a phase separation polymerization reaction in the presence of a phase separation agent.

2. The manufacturing method according to claim 1, further comprising the steps of:

(1) a dehydration step 1 comprising heating a mixture containing an organic amide solvent, a sulfur source including an alkali metal hydrosulfide and an alkali metal hydroxide, and discharging at least part of the distillate containing water from the inside of the system containing the mixture to the outside of the system;

(2) a charging step 2 comprising mixing the mixture remaining inside the system in the dehydration step 1 with a dihalo aromatic compound to prepare a charged mixture containing an organic amide solvent, a charged sulfur source, an alkali metal hydroxide, water and a dihalo aromatic compound, wherein the amount of the dihalo aromatic compound in the charged mixture is from 0.95 to 1.02 mol per mol of charged sulfur source;

(3) a prestage polymerization step 3 comprising heating the charged mixture to a temperature of from 170 to 270° C. and performing a polymerization reaction of the charged sulfur source and the dihalo aromatic compound in a water-containing organic amide solvent, adding a disulfide compound in an amount of from 0.001 to 0.03 mol per mol of charged sulfur source during the time interval between a stage when the conversion ratio of the dihalo aromatic compound is 50% and a stage when a polyhalo aromatic compound is added and reacting the mixture, adding a polyhalo aromatic compound in an amount of from 0.002 to 0.06 mol per mol of charged sulfur source and an amount of from 0.2 to 12 mol per mol of disulfide compound to the polymerization reaction mixture at a stage when the conversion ratio of the dihalo aromatic compound reaches 80% or greater and performing a polymerization reaction; and (4) a poststage polymerization step 4 comprising heating the polymerization reaction mixture to a temperature of 240° C. or higher and performing a phase separation polymerization reaction at a temperature of from 240 to 290° C. in the presence of a phase separation agent.

3. The manufacturing method according to claim 1, wherein the total of the halogen content in the dihalo aromatic compound and the halogen content in the polyhalo aromatic compound is from 1.01 to 1.05 mol per mol of charged sulfur source.

4. The manufacturing method according to claim 2, wherein when the conversion ratio of the dihalo aromatic compound in the prestage polymerization step 3 reaches 80% or greater, a phase separation agent is added.

* * * * *